Dec. 26, 1967    L. D. LIPSCHUTZ ET AL    3,359,851
TWO COLOR MULTIPLE BEAM INTERFEROMETER FOR
MEASURING SMALL SEPARATIONS

Filed April 29, 1964    2 Sheets-Sheet 1

INVENTORS
LEWIS D. LIPSCHUTZ
TSENG K. CHOW

BY *W S Robertson*

ATTORNEY

United States Patent Office 3,359,851
Patented Dec. 26, 1967

3,359,851
TWO COLOR MULTIPLE BEAM INTERFEROMETER FOR MEASURING SMALL SEPARATIONS
Lewis D. Lipschutz and Tseng K. Chow, Poughkeepsie, N.Y., assignors to International Business Machines Corporation, New York, N.Y., a corporation of New York
Filed Apr. 29, 1964, Ser. No. 363,368
3 Claims. (Cl. 88—14)

ABSTRACT OF THE DISCLOSURE

Method and apparatus for producing interference patterns according to the separation between two surfaces, particularly the surfaces of a tape recorder head and a moving magnetic tape. The subject to be measured is illuminated in two regions with two different colors. At the line where the two regions meet, the interference patterns are interpreted to determine the separation between the surfaces. There is a system of mirrors joined at a knife edge and an optical system for focusing the image of the knife edge on the measured surfaces to produce a very fine separation between the two illuminated regions.

---

This invention relates to a method and apparatus for measuring the distance between a measured subject and a reference; more specifically, to a method and apparatus for making optical interference patterns to measure a very small distance between the subject and its reference while the subject is moving with respect to the reference.

In the specific examples later, the apparatus will be described as it is used to measure the distance between a magnetic tape and the magnetic recording head that the tape is moved past. To develop magnetic recording apparatus that can store bits closer together on magnetic tape, it is necessary to study the physical spacing between the tape and the recorder head as the tape moves past the head. Known previous attempts to measure this small distance have not been satisfactory at the very small distances, less than 100 microinches. The prior art has suggested making the tape and the recording head (or models) conductive so that with the intervening air film they form a capacitor that varies in value with the distance between them. The prior art has also suggested recording a test pattern on a tape and interpreting the recording as a measure of the distance. Both techniques have recognized serious limitations.

The general object of this invention is to provide a new and improved method of measuring the distance between a moving tape and a recording head, or a similar subject and reference. Another object is an improved device for producing optical interference patterns for measuring the distance of a subject from a reference.

Because of the wave nature of light, monochromatic light emitted from two nearby sources (such as two apertures or two reflecting surfaces) produces interference; the peaks and valleys of the wave fronts of the individual sources combine to produce a pattern of light and dark bands according to the phase difference between the two sources. When light is reflected from the surface of a measured subject and also from a nearby reference surface, the dark lines in the interference pattern are fairly well defined and indicate equidistant points on the subject with respect to corresponding points on the reference, like a contour map in which a line indicates points of equipotential with respect to seal level; this analogy will help to explain the interference map.

Although the distance between contour lines on the map is known, a half wave length, the map does not directly indicate the absolute distance a line represents.

To establish reference lines of known absolute value, the prior art has suggested mapping in two different colored lights; the two colors produce different spacing between lines, and the contour lines coincide only at absolute distances that are multiples of the two half wave lengths. From independent information it may be possible to determine which multiple of the distance should be assigned to each coincident pair of lines. Interpreting a two color map is quite difficult and it has undesirably involved much personal judgment by the people making the measurements. A more specific object of this invention is to provide an improved apparatus and method for making and interpreting multiple color maps.

Absolute values can be assigned more confidently to coincident pairs of lines if the distance from one pair to the next (which will be called the cyclic range) is made rather large, preferably large enough that only one multiple falls in the expected range of measurements. The cyclic range can be increased by making both wave lengths rather long and fairly close together. However, when wave lengths are selected to be close together for a long cyclic range another problem has occurred; there are several pairs of lines that nearly match on either side of the coincident pair. Because experimental error keeps the coincident lines from actually matching except by chance, it is hard to identify the coincident pair confidently if there are several nearby pairs that nearly match. Thus it is desirable to keep the spacing between nearby non-coincident pairs greater than the spacing between a coincident pair, allowing for experimental error. The smallest spacing between non-coincident nearby pairs, neglecting experimental errors, will be called the minimum span. A more specific object of this invention is to provide a method and apparatus for making multiple color interference maps with both a wide cyclic range and a wide minimum span.

The apparatus of this invention uses preferably three or more colors. With this arrangement the colors can be selected more easily to provide a high minimum span and a long cyclic range.

It has been difficult to make useful interference maps of even two colors. The prior art has suggested, for example, forming two adjacent different colored beams by means of a two part filter transmitting one frequency on one side of a dividing line and another frequency on the other side. Maps made by these devices have been hard to read because the dividing line between the two filters has appreciable width that obscures the contour lines at the critical point where the coincident pairs are to be identified. The prior art has also suggested rather complex optical systems for forming two separate beams of different colors and joining the beams along a common boundary. An important object of this invention is to provide a new and improved structure for obtaining interference patterns having two or more colors; more specifically, in one aspect to provide a structure that does not require aligning parallel beams.

In the preferred embodiment of this apparatus the reference surface and the measured subject surface are illuminated with a white light, and the reflected light with the interference patterns is directed through filters that transmit selected components of the white light to means for displaying the interference patterns of each color. The preferred apparatus produces a separate map for each color, and each map is given guide markers for aligning it with the others. The information on the separate maps is transformed into a contour plot of the subject surface in which the coincident pairs of contour lines merge recognizably.

In a second embodiment of this apparatus, two or more sources of different colored light are reflected into the subject and reference surfaces by means of a mirror having individual surfaces for each color and having a sharp knife-edge dividing line between these surfaces. An optical system is provided that forms an image of the mirror on the subject and reference surfaces; since this image contains the sharp edge between reflected surfaces, the apparatus illuminates the subject and reference in clearly defined regions of different colors.

The description of the two specific embodiments of the invention will explain other problems in providing a suitable method and apparatus and will suggest the corresponding objects, advantages, and features of this invention.

Introduction

Figure 1:
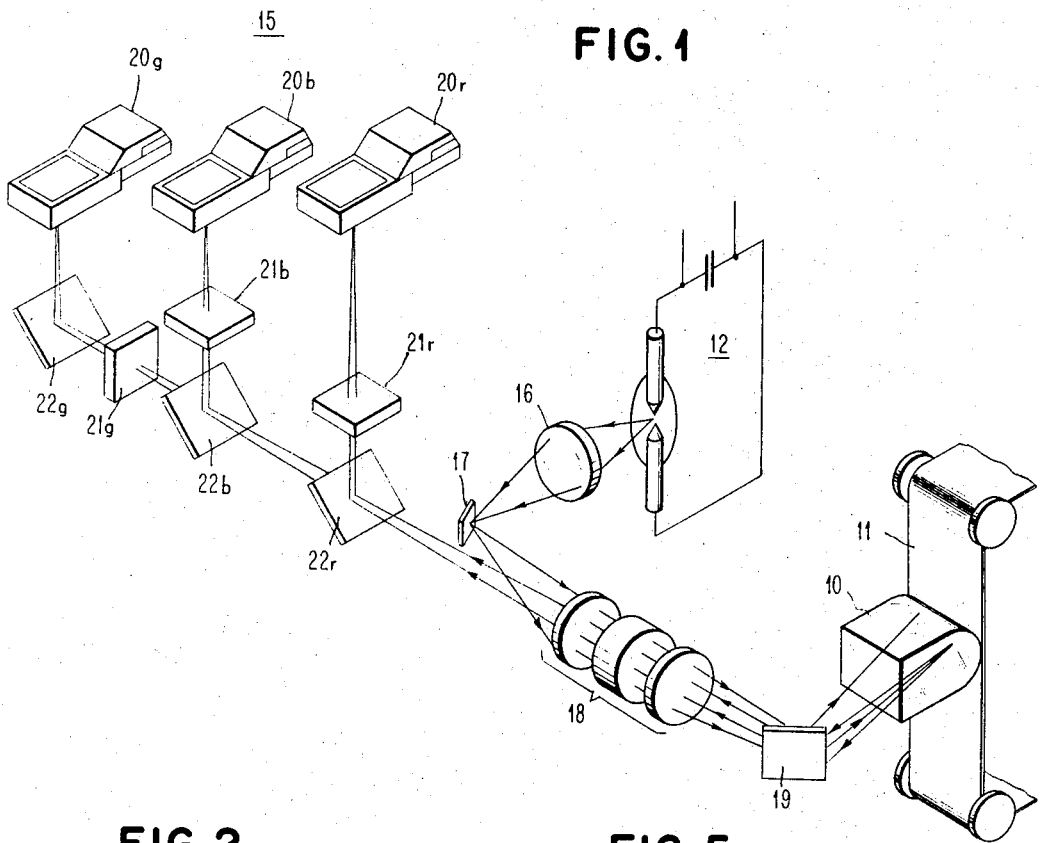
FIGURE 1 is a schematic of the preferred embodiment of the apparatus of this invention.
Figure 4:
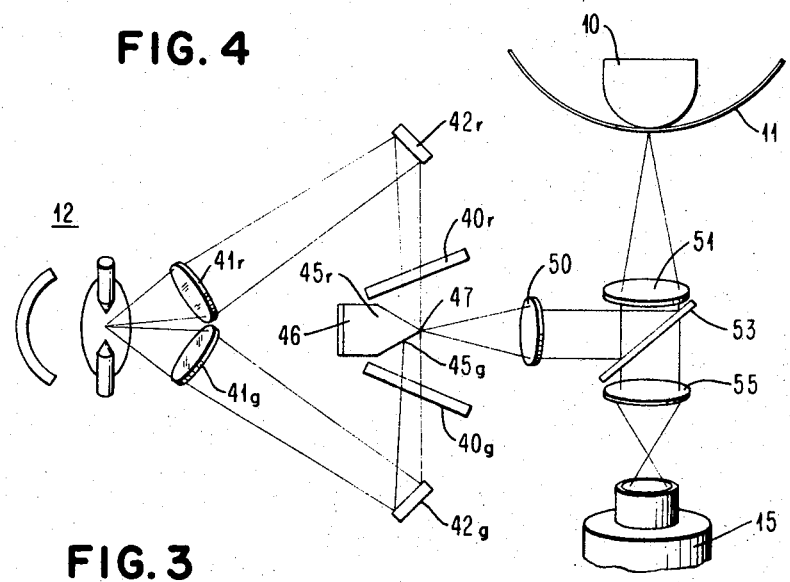
FIGURE 4 is a schematic of a second embodiment of the apparatus of this invention.

Both FIGURES 1 and 4 illustrate the apparatus as it is used in measuring the distance between a stationary tape recorder head 10 and a magnetic tape 11 that is driven past the recorder head by a conventional apparatus not shown. Light from a source 12 is directed through an optical system to illuminate the head and tape. Means 15, such as the cameras illustrated, receives the reflected light and photographs or otherwise operates on the interference patterns.

The apparatus is intended to be used with actual subjects that have the appropriate optical characteristics or with models of subjects that are constructed to mechanically simulate their actual counterparts and to transmit and reflect light appropriately. As FIGURE 4 shows, the tape recorder head 10 may be given a reflective surface and the tape may be made of a suitable transparent material that reflects some of the light and transmits some of the light to the tape recorder head 10 to be subsequently reflected. The transparent tape may be coated with a material such as aluminum or nickel to increase its reflectivity. Conversely, as FIGURE 1 shows, the tape 11 may be made of an opaque reflecting material (for example, the tape may be plated with aluminum or chromium), and the recorder head 10 may be made of transparent material such as glass. The transparent material of head 10 may be coated with a suitable material such as titanium dioxide to increase its reflectivity.

Source 12 is preferably a flash lamp for photographing the interference patterns substantially instantaneously as the tape moves past head 10; a continuous light may be used as source 12 for viewing the interference patterns in setting up the apparatus. Since the contour spacing equals a half wave length multiplied by the cosine of the angle between the incident and reflected light, the optical system is preferably arranged for the paths of the incident and reflected light to be along a common line as in FIGURE 4, or nearly so as in FIGURE 1. The structures of FIGURE 1 and FIGURE 4 differ in their arrangement for illuminating the head and tape with multiple color light and operating on the reflected light as will be described next.

The embodiment of FIGURE 1

In the embodiment of FIGURE 1 light source 12 produces light that is white or at least contains the frequencies that will be described later. The surface of the tape 11 and head 10 are illuminated in white light and separate filter and camera systems are provided for making separate maps for each color.

The optical system for directing light from source 12 to illuminate the recorder head 10 and tape 11 comprises a lens 16 that forms an image of the light source, a mirror 17 that is offset from the line of the reflected light, to direct the image of source 12 along approximately the line of incidence and reflection, a single camera lens system 18 that is positioned to transmit both the incident and reflected light, and a mirror 19 that provides for bending the path of the light for mounting the components conveniently. When light is reflected from the recorder head surface and the tape surface, interference occurs among all of the frequencies present, and if the white reflected light were viewed or photographed directly, the lower order interference bands of various colors would appear.

The reflected light is separated into three colors and the interference patterns of these colors are photographed to form three maps. These colors will be called, somewhat arbitrarily, red, green and blue, (preferably 6120 A., 5440 A. and 4352 A. respectively), and identical elements associated with a particular color are identified collectively by a common number and individually by corresponding letter suffixes $r$, $g$ and $b$. The camera system 16 of FIGURE 1 comprises a common lens 18 already introduced and three film holders 20$r$, $g$ and $b$. The shutters of film holders 20 are conventionally synchronized with the means for turning on flash lamp 12. For seting up the system when source 12 is a continuous light, a ground glass may be positioned to display the interference patterns. A plurality of filters 21$r$, $g$ and $b$ and mirrors 22$r$, $g$ and $b$ are provided for directing a particular component of the reflected light to the associated camera 20. Preferably each mirror 22 except the last is a dichroic mirror that has the frequency characteristic to reflect the associated color to its filter 21 and to transmit colors of either a higher or lower frequency. Specifically, the first dichroic mirror 22$r$ reflects red light to its associated filters 21$r$ and it transmits higher frequencies including green and blue. The next dichroic mirror 22$b$ is selected to reflect blue light to its associated filter and to transmit the higher frequencies including green, to the last mirror 22$g$. The last mirror 22$g$ may be a simple front surfaced mirror since light is not transmitted beyond this stage.

Figure 2:
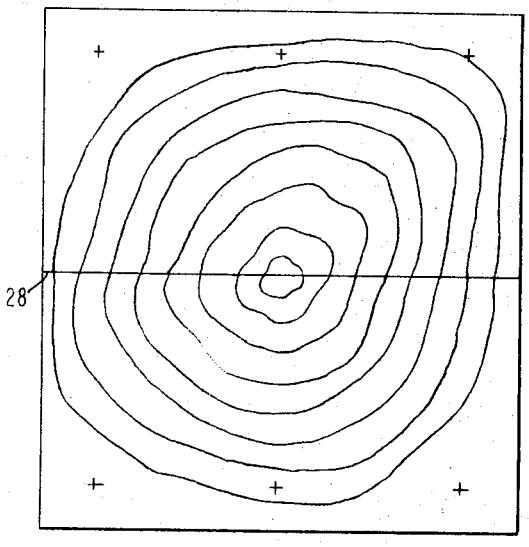
FIGURE 2 is a map of an interference pattern produced by the apparatus of FIGURE 1.
Figure 3:
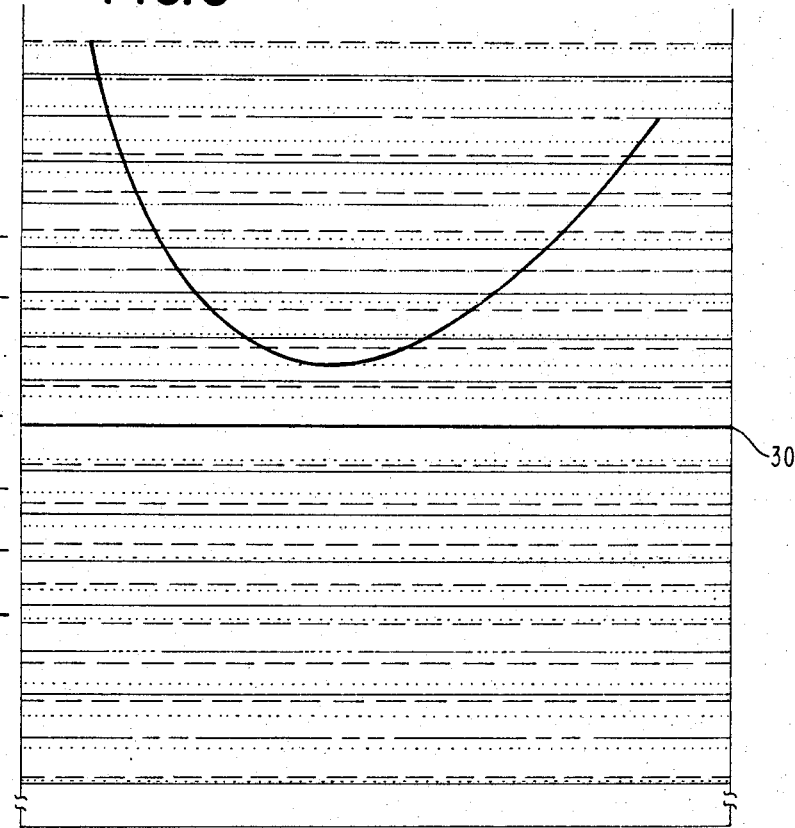
FIGURE 3 is a graph showing the contour map of FIGURE 2 in section.

FIGURE 2 illustrates one of three simultaneous maps; the other two maps are, of course, very similar except for the spacing of their contour lines and for the presence or absence of some higher or lower order lines. Guide marks such as the crosses shown in FIGURE 2 are formed on each of the maps (by first photographing the guide marks pattern) to help line up corresponding points on the three maps; the guide marks also help to compensate for distortion that might occur in one photograph but not the others. Superimposing the three maps (distorting them as necessary to align the guide marks) would give a more complex contour map in which lines in each of the three maps would coincide whenever the absolute value of distance is a multiple of the three half wave lengths; FIGURE 3 illustrates one technique for analyzing the effects of all three maps. From the physical arrangement of the recorder head 10 and tape 11 in FIGURE 1, it is known that the contour of FIGURE 2 represents a hill rather than a valley. FIGURE 3 is a section of the three maps constructed along line 28 in FIGURE 2. The curved line in FIGURE 3 is a profile of this contour along line 28. Where the contour lines in FIGURE 2 cross section line 28, the curve in FIGURE 3 crosses a horizontal line that represents the corresponding line in FIGURE 2. As FIGURE 3 shows, pairs of lines coincide or nearly coincide several times in the map. Considering only two colors, their short cyclic range makes it uncertain which coincident pair corresponds to a particular absolute value, however, the short cycle range for two colors is associated with the fact that three lines are not confusingly close together except where they in fact coincide. In the graph of FIGURE 3 there is a single line 30 where all three colors coincide, that is, where the absolute distance is a multiple of the three half wave lengths. With the apparatus of this invention, it is possible to make the cyclic range for the combination of three colors large enough that the absolute value can be assigned confidently from information that is usually independently known about the spacing of the tape from the recorder head. From the known value of reference line 30 and the known spacing between lines of a particular wave length, one can determine the absolute distance of any point on the section line of FIGURE 3.

*The embodiment of FIGURE 4*

Figure 5:
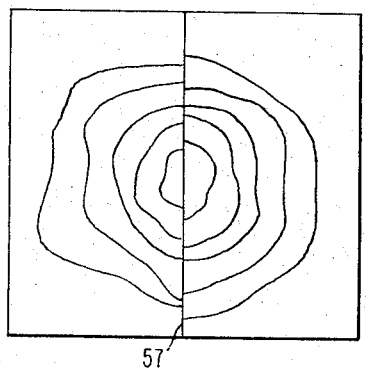
FIGURE 5 is a map of an interference pattern produced by the apparatus of FIGURE 4.

In the embodiment of FIGURE 4 the light source 12 is made to illuminate the recorder head and tape with different colors, somewhat arbitrarily called red and green, on either side of a very fine dividing line. The light reflected from the two differently colored regions of the recorder head and the tape is directed to a camera and photographed on a single film. The means for illuminating the recorder head and tape in two regions comprises filters 40r, 40g and a system of lenses 41 and mirrors 42 that direct light from source 12 through the two filters. Light from the two filters is directed to illuminate two surfaces 45r, 45g of a mirror 46 that are joined along a sharp knife-edge 47. A person looking at mirror 46 from the right in FIGURE 4 would see red in mirror 46r, green in mirror 46g, and the sharp knife-edge 47 separating the two regions, even though the reflected light is not kept in separate regions to the right of surfaces 45. Similarly, a system of lenses 50, 51 focuses the image of the surfaces 45 and the knife-edge 47 onto the recorder head 10 and tape 11 and thereby illuminates the head and tape in two finely separated regions. A transparent mirror 53 called a beam splitter is positioned to direct light from mirror 46 along the line of incident and reflected light to illuminate the recorder head and the tape; it also transmits the reflected light through a lens 55 to the single camera 16. When light source 12 is turned on to illuminate the recorder head and tape, the camera receives a two part interference pattern that FIGURE 5 illustrates. A line 57 has been drawn on the map of FIGURE 5 to show the boundary between the two parts. Contour lines on one side of line 57 are closely spaced and lines on the other side of the map are more widely spaced. Pairs of lines coincide along line 57 at intervals that are spaced apart as far as possible (by using long wave length light).

The apparatus illustrated in FIGURE 4 can be modified to have additional reflecting surfaces to provide maps with three or more regions of different color or the two surfaces 45r, 45g on mirror 46 may be spaced apart to provide an aperture for transmitting light of a third color. In three section maps the frequencies are chosen so that one or more of the contour lines will run continuously through all sections of the map to identify the line whose absolute value is a multiple of all the half wave lengths.

*Other embodiments*

Although the disclosed method of measuring the distance between a tape and a recorder head is preferably carried out with one of the disclosed embodiments of the apparatus, the method may also be carried out with some optical interference apparatus that are known for measuring a stationary subject. The specific embodiments of the apparatus of FIGURE 1 and FIGURE 4 illustrate counterpart techniques and components, and many variations of each specific embodiment will be suggested by considering these counterparts and others well known in the art. One important example is that the subject can be illuminated with white light as in FIGURE 1; and the mirror 46 and filters 40 of FIGURE 4 can be used to split the reflected white light into two or more regions that can be recorded by a single camera to produce a map like FIGURE 5. The specific suggestion of an apparatus and method for use with a tape recorder will suggest many other applications for the apparatus and other modifications that might be useful in adapting the device for a specific application. From the two embodiments described in detail and the others suggested, those skilled in the art will recognize other variations and applications within the spirit of the invention and the scope of the claims.

What is claimed is:

1. An apparatus for directing light through a transparent subject to a nearby surface of a reflective subject in such a way that interference patterns appear in the light reflected from the surface of the reflective subject and the nearby surface of the transparent subject according to the separation between the surfaces and the wavelength of the light, the surfaces being illuminated in one region with a light of one color and in an adjoining region with a light of a different color whereby lines in the interference pattern corresponding to different colors which coincide signify a predetermined absolute value of the separation between the two subject surfaces, comprising, a mirror having two surfaces meeting along a knife edge;

an optical system arranged to focus the image of said knife edge on said surfaces of said subjects in such a way that interference patterns appear in the light reflected from the subject surfaces;

means to illuminate one of said mirror surfaces with light of a first color and to illuminate the other of said mirror surfaces with light of a different color, whereby the region of said subject surfaces on one side of the image of said knife edge is illuminated in said first color and the region of said subject surfaces on the other side of said image of said knife edge is illuminated in said other color;

a camera positioned to photograph the subject surfaces to produce a record of the interference pattern.

2. Apparatus according to claim 1 in which said means for illuminating said mirror surfaces comprises a single flash source, an optical system ararnged to direct light from said source to said two mirror surfaces, and filters positioned to give the light directed to each said mirror surface said colors.

3. Apparatus according to claim 1 including a semi-transparent mirror positioned to reflect light from said mirror surfaces to said subject surfaces and to transmit light reflected from said subject surfaces to said camera.

References Cited

UNITED STATES PATENTS 3,028,782    4/1962    Berhardt et al. _____ 88—14

OTHER REFERENCES

Magyar et al., Nature, vol. 198, No. 4877, April 1963, pp. 255–256.

Schulz, Journal of the Optical Society of America, vol. 40, No. 3, March 1950, pp. 177–178.

DAVID H. RUBIN, *Primary Examiner.*

JEWELL H. PEDERSEN, *Examiner.*

R. J. STERN, *Assistant Examiner.*